(12) United States Patent
Okamoto et al.

(10) Patent No.: US 9,165,530 B2
(45) Date of Patent: Oct. 20, 2015

(54) THREE-DIMENSIONAL IMAGE DISPLAY APPARATUS

(71) Applicant: JVC KENWOOD CORPORATION, Yokohama (JP)

(72) Inventors: Naoya Okamoto, Yokohama (JP); Hiroyuki Takada, Fujisawa (JP); Takeshi Makabe, Yokosuka (JP); Akihiro Sato, Yokosuka (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 218 days.

(21) Appl. No.: 13/888,914

(22) Filed: May 7, 2013

(65) Prior Publication Data

US 2013/0241977 A1    Sep. 19, 2013

Related U.S. Application Data

(63) Continuation of application No. PCT/JP2011/075598, filed on Nov. 7, 2011.

(30) Foreign Application Priority Data

Nov. 8, 2010   (JP) ................. 2010-250045

(51) Int. Cl.
*G09G 3/20* (2006.01)
*G09G 5/14* (2006.01)
(Continued)

(52) U.S. Cl.
CPC *G09G 5/14* (2013.01); *G02B 27/26* (2013.01); *G03B 35/16* (2013.01); *H04N 13/0029* (2013.01); *H04N 13/0051* (2013.01); *H04N 13/0438* (2013.01); *G09G 3/003* (2013.01); *G09G 3/2022* (2013.01); *G09G 2340/0435* (2013.01)

(58) Field of Classification Search
CPC . G09G 3/2022; G09G 3/2025; G09G 3/2029; G09G 3/2033; G09G 3/2037; G09G 3/2059; G09G 3/2062; G09G 3/2066
See application file for complete search history.

(56) References Cited

U.S. PATENT DOCUMENTS

| 5,541,618 A | 7/1996 | Shinoda |
| 5,724,054 A | 3/1998 | Shinoda |

(Continued)

FOREIGN PATENT DOCUMENTS

| JP | 4-195188 A | 7/1992 |
| JP | 2002-95010 A | 3/2002 |

(Continued)

OTHER PUBLICATIONS

Japanese Patent Application No. 2010-250045, Official Action dated Apr. 22, 2014, three (3) pages.

*Primary Examiner* — Gerald Johnson
*Assistant Examiner* — Christopher Kohlman
(74) *Attorney, Agent, or Firm* — Nath, Goldberg & Meyer; Jerald L. Meyer

(57) ABSTRACT

A signal processor converts an input 3D image signal into a signal in which a left-eye signal and right-eye signal are rearranged temporally alternately. A driver of a liquid crystal display element includes a sub-frame data generator configuring all the sub-frames with step bit pulses and generating sub-frame data by using a drive gradation table in which the last sub-frame reaches a drive state when a drive gradation is "1" and the number of sub-frames reaching the drive state is increased one by one toward ahead of a sub-frame which has already reached the drive state, every time the drive gradation is increased by one. The liquid crystal display element is driven by the driver. An illumination optical system causes illumination light to enter into the liquid crystal display element. A projection lens projects modulated light emitted from the liquid crystal display element.

4 Claims, 17 Drawing Sheets

(51) Int. Cl.
  *G02B 27/26*  (2006.01)
  *G03B 35/16*  (2006.01)
  *H04N 13/00*  (2006.01)
  *H04N 13/04*  (2006.01)
  *G09G 3/00*   (2006.01)

(56) References Cited

U.S. PATENT DOCUMENTS

| 6,097,357 | A |   | 8/2000  | Shinoda et al. |         |
|-----------|---|---|---------|----------------|---------|
| 6,144,364 | A | * | 11/2000 | Otobe et al.   | 345/691 |
| 6,630,916 | B1|   | 10/2003 | Shinoda        |         |
| 2005/0140584 | A1 | * | 6/2005 | Kim et al.    | 345/60  |
| 2009/0135304 | A1 | * | 5/2009 | Inoue et al.  | 348/712 |
| 2010/0033555 | A1 | * | 2/2010 | Nagase et al. | 348/43  |

FOREIGN PATENT DOCUMENTS

| JP | 2002-251173 A | 9/2002  |
| JP | 2006-284854 A | 10/2006 |
| JP | 2008-225105 A | 9/2008  |
| JP | 2009-31523 A  | 2/2009  |
| JP | 2010-61105 A  | 3/2010  |

\* cited by examiner

TRANSMISSION PERIOD    347[μs]

| GRADA-TION | SF1 347 | SF2 347 | SF3 347 | SF4 347 | SF5 347 | SF6 347 | SF7 347 | SF8 347 | SF9 347 | SF10 347 | SF11 347 | SF12 347 [μs] |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

FIG. 15
2D DISPLAY
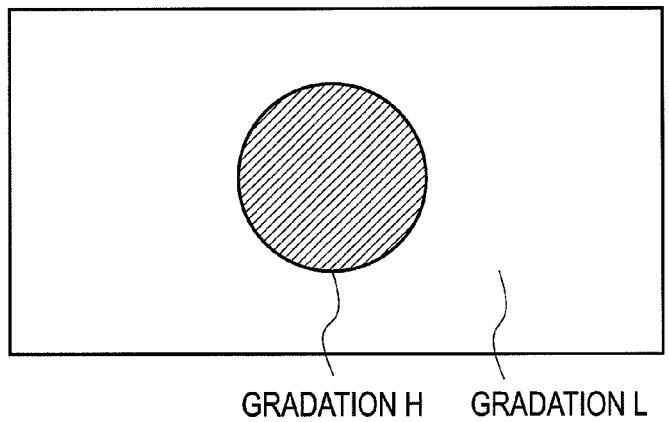
GRADATION H   GRADATION L
FIG. 16
3D DISPLAY (BOTH EYE OBSERVATION WITHOUT GLASSES)
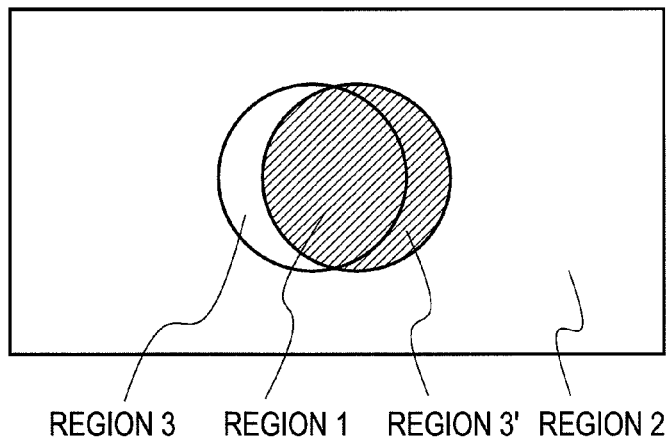
REGION 3   REGION 1   REGION 3'   REGION 2
FIG. 17
| REGION NAME | LEFT (L) | RIGHT (R) | LEFT (L) | RIGHT (R) | LEFT (L) | RIGHT (R) |
| --- | --- | --- | --- | --- | --- | --- |
| REGION 1 | H | H | H | H | H | H |
| REGION 3 | L | H | L | H | L | H |
| REGION 3' | H | L | H | L | H | L |
| REGION 2 | L | L | L | L | L | L |

3D DISPLAY: ONE EYE IMAGE THROUGH GLASS (LEFT EYE)

REGION 3   REGION 1   REGION 2

TRANSMISSION PERIOD 347[μs]

| GRADA-TION | SF1 347 | SF2 347 | SF3 347 | SF4 347 | SF5 347 | SF6 347 | SF7 347 | SF8 347 | SF9 347 | SF10 347 | SF11 347 | SF12 347 | [μs] |
|---|---|---|---|---|---|---|---|---|---|---|---|---|---|
| 0 | 0 | 0 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 0 | 0 | |
| 2 | 1 | 1 | 0 | 0 | 0 | 0 | 0 | 0 | 0 | 0 | 0 | 0 | |
| 3 | 1 | 1 | 1 | 0 | 0 | 0 | 0 | 0 | 0 | 0 | 0 | 0 | |
| 4 | 1 | 1 | 1 | 1 | 0 | 0 | 0 | 0 | 0 | 0 | 0 | 0 | |
| 5 | 1 | 1 | 1 | 1 | 1 | 0 | 0 | 0 | 0 | 0 | 0 | 0 | |
| 6 | 1 | 1 | 1 | 1 | 1 | 1 | 0 | 0 | 0 | 0 | 0 | 0 | |
| 7 | 1 | 1 | 1 | 1 | 1 | 1 | 1 | 0 | 0 | 0 | 0 | 0 | |
| 8 | 1 | 1 | 1 | 1 | 1 | 1 | 1 | 1 | 0 | 0 | 0 | 0 | |
| 9 | 1 | 1 | 1 | 1 | 1 | 1 | 1 | 1 | 1 | 0 | 0 | 0 | |
| 10 | 1 | 1 | 1 | 1 | 1 | 1 | 1 | 1 | 1 | 1 | 0 | 0 | |
| 11 | 1 | 1 | 1 | 1 | 1 | 1 | 1 | 1 | 1 | 1 | 1 | 0 | |
| 12 | 1 | 1 | 1 | 1 | 1 | 1 | 1 | 1 | 1 | 1 | 1 | 1 | |

| | [μs] |
|---|---|
| SF1 | 347 |
| SF2 | 347 |
| SF3 | 347 |
| SF4 | 347 |
| SF5 | 347 |
| SF6 | 347 |
| SF7 | 347 |
| SF8 | 347 |
| SF9 | 347 |
| SF10 | 347 |
| SF11 | 347 |
| SF12 | 347 |
| | 4164 |

⇒

| [μs] |
|---|
| 434 |
| 399 |
| 364.5 |
| 347.5 |
| 312.5 |
| 294.5 |
| 277.5 |
| 277.5 |
| 312 |
| 347 |
| 381.5 |
| 416.5 |
| 4164 |

THREE-DIMENSIONAL IMAGE DISPLAY APPARATUS

CROSS REFERENCE TO RELATED APPLICATION

This is a continuation application based on PCT application No. PCT/JP2011/075598 filed on Nov. 7, 2011, which claims the benefit of priority from Japanese Patent Application No. 2010-250045 filed on Nov. 8, 2010, the entire contents of which are incorporated by reference herein.

BACKGROUND

The present invention relates to a three-dimensional image display apparatus capable of forming a three-dimensional image by binocular parallax.

Recently, a three-dimensional image display apparatus is attracting lots of attention for showing two or more images having parallax on a screen or the like and causing an observer to feel as if an object exists in three dimensions. Until now, in projecting a three-dimensional image, a method of using two liquid crystal projectors or the like has been generally performed. Recently, projection of a three-dimensional image using one liquid crystal projector or the like is becoming popular. At this time, usually an observer wears a pair of liquid crystal shutter glasses, and light of a left-eye image enters into the left eye and light of a right-eye image enters into the right eye by switching of a liquid crystal shutter, so that a three-dimensional image can be observed.

Patent document 1 (Japanese Patent Laid-Open No. 2009-31523) discloses a three-dimensional image display apparatus which can suppress crosstalk generated when a frame frequency is increased, by controlling switching timing of liquid crystal shutter glasses.

Meanwhile, the cause of crosstalk generation in three-dimensional image projection is not only on the side of the liquid crystal shutter but also on the side of the three-dimensional image display apparatus. Specifically, when a liquid crystal display apparatus is used as the three-dimensional image display apparatus, it is required to efficiently reduce crosstalk caused by a response characteristic of a liquid crystal display element.

Accordingly, the present invention has been achieved in view of such a situation, and aims to provide a three-dimensional image display apparatus which can reduce crosstalk when a three-dimensional image is displayed by one liquid crystal projector.

SUMMARY

A first aspect of a present embodiment provides a three-dimensional image display apparatus including: a signal processor configured to convert an input 3D image signal into a signal in which a left-eye signal and a right-eye signal are rearranged temporally alternately; a driver including a sub-frame data generator configured to, according to the signal in which the left-eye signal and the right-eye signal are rearranged temporally alternately, configure all sub-frames with step bit pulses, and generate sub-frame data by using a drive gradation table in which (1) the last sub-frame reaches a drive state when a drive gradation is "1" and (2) the number of sub-frames reaching the drive state is increased one by one toward ahead of a sub-frame which has already reached the drive state, every time the drive gradation is increased by one; a liquid crystal display element configured to be driven by the driver; an illumination optical system configured to cause illumination light to enter into the liquid crystal display element; and a projection lens configured to project modulated light emitted from the liquid crystal display element.

A second aspect of the present embodiment provides a three-dimensional image display apparatus including: a signal processor configured to convert an input 3D image signal into a signal in which a left-eye signal and a right-eye signal are rearranged temporally alternately; a driver including a sub-frame generator configured to, according to the signal in which the left-eye signal and the right-eye signal are rearranged temporally alternately, configure sub-frames in which at least a part of the sub-frames has a different drive period and generate sub-frame data by using a drive gradation table in which (1) the last sub-frame reaches a drive state when a drive gradation is "1" and (2) the number of sub-frames reaching the drive state is increased one by one toward ahead of the sub-frame which has already reached the drive state, every time the drive gradation is increased by one; a liquid crystal display element configured to be driven by the driver; an illumination optical system configured to cause illumination light to enter into the liquid crystal display element; and a projection lens configured to project modulated light emitted from the liquid crystal display element.

According to the present invention, it is possible to provide a three-dimensional image display apparatus which can reduce crosstalk when a three-dimensional image is displayed by one liquid crystal projector.

BRIEF DESCRIPTION OF THE DRAWINGS

FIG. 15 is a diagram showing a screen for illustrating crosstalk generation according to the first embodiment of the present invention.

FIG. 16 is a diagram showing an image projected onto a screen from the liquid crystal display apparatus when 3D three-dimensional display of the image in FIG. 15 is performed by the three-dimensional image display apparatus according to the first embodiment of the present invention.

FIG. 17 is a diagram showing temporal changes of screen gradations for region 1, region 2, region 3, and region 3' shown in FIG. 16.

DETAILED DESCRIPTION

First Embodiment

Hereinafter, a three-dimensional image display apparatus according to the present invention will be described with reference to the accompanying drawings. In the following, there will be described an example of a three-dimensional image display apparatus using a liquid crystal display apparatus 100 that includes a reflection-type liquid crystal display element 6 of an active-matrix-type as a display panel.

Figure 1:
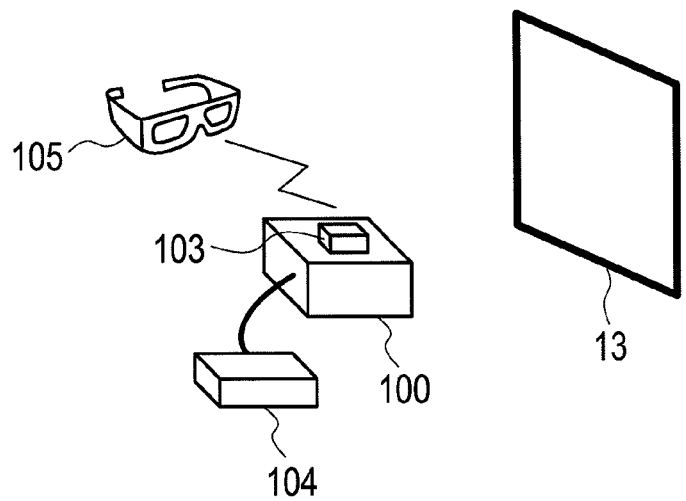
FIG. 1 is a diagram for illustrating a three-dimensional display by a three-dimensional image display apparatus using a liquid crystal display apparatus according to a first embodiment of the present invention.

FIG. 1 is a diagram for illustrating a three-dimensional display by the three-dimensional image display apparatus using the liquid crystal display apparatus 100. A three-dimensional image signal source 104 sends a 3D image signal to the liquid crystal display apparatus 100. The liquid crystal display apparatus 100 converts the 3D image signal into a left-eye signal and a right-eye signal in a temporal order by using a predetermined circuit and projects the signals alternately on a screen. An observer observes a three-dimensional image projected onto a screen 13 by wearing a pair of liquid crystal shutter glasses 105 which performs shutter operation in accordance with a drive signal from a liquid crystal shutter drive signal transmitter 103 built in or connected to the liquid crystal display apparatus 100.

Figure 2:
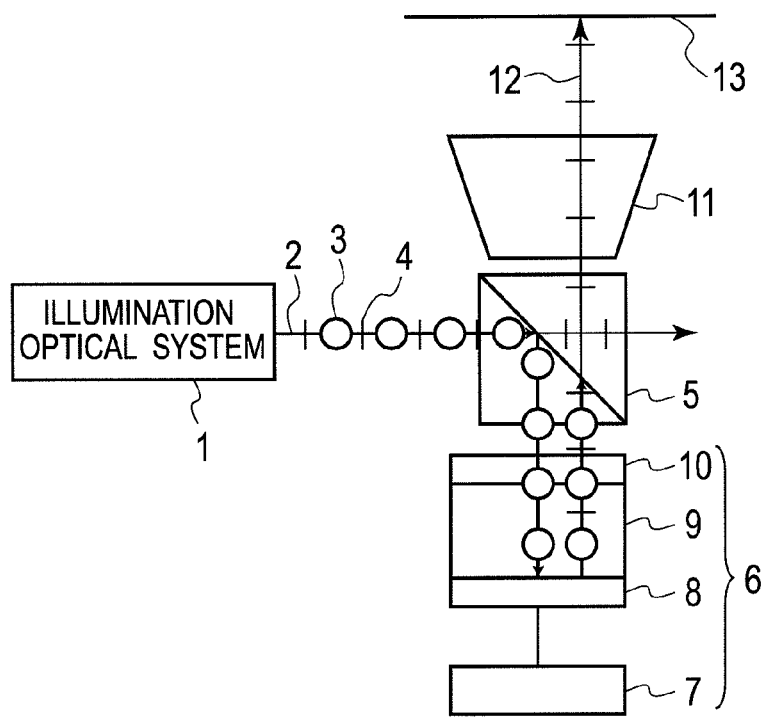
FIG. 2 is a schematic configuration diagram showing a liquid crystal display apparatus using a reflection-type liquid crystal display element according to the first embodiment of the present invention.

Next, there will be described a schematic configuration of the liquid crystal display apparatus 100 and the reflection-type liquid crystal display element 6. FIG. 2 is a schematic configuration diagram showing the liquid crystal display element 100 using the reflection-type liquid crystal display element 6. The liquid crystal display apparatus 100 is configured schematically including the reflection-type liquid crystal display element 6, a polarizing beam splitter 5 (hereinafter, called PBS), and a projection lens 11. The reflection-type liquid crystal display element 6 has a structure in which a liquid crystal 9 is sealed between a counter electrode (also referred to as a transparent electrode) 10 and a pixel electrode 8.

Light 2, emitted from an illumination optical system 1, including S-polarized light 3 and P-polarized light 4 enters into the PBS 5. The light is subjected to polarization separation in the PBS 5. The S-polarized light 3 is reflected by a polarization separation plane of the PBS 5 and travels to the side of the reflection-type liquid crystal display element 6. The P-polarized light is transmitted through the polarization separation plane of the PBS 5. The liquid crystal 9 of the reflection-type liquid crystal display element 6 modulates the input S-polarized light in accordance with a voltage applied between the pixel electrode 8 and the counter electrode 10 by a pixel circuit 7. The S-polarized light having entered into the counter electrode 10 is modulated in a process until the S-polarized light is reflected by the pixel electrode 8 and emitted from the counter electrode 10, and is emitted from the counter electrode 10 as light including the P-polarized light and the S-polarized light. In the light emitted from the counter electrode 10, only a P-polarized light component of the modulated light passes through the PBS 5 and an S-polarized light component is reflected by the PBS 5. The P-polarized light passing through the PBS 5 is emitted from the projection lens 11 and the emitted light 12 is projected onto the screen 13 for image display. Note that the intensity of output light to be described below means the illuminance of output light measured on the screen 13.

Figure 3:
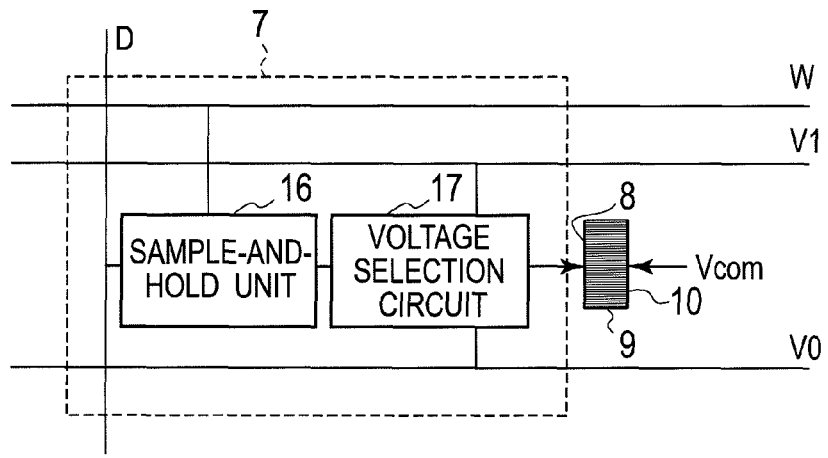
FIG. 3 is a diagram showing a drive circuit configuration of each pixel in a digital-drive reflection-type liquid crystal display element according to the first embodiment of the present invention.

FIG. 3 is a diagram showing a drive circuit configuration of each pixel in the digital drive reflection-type liquid crystal display element 6. The individual pixel of the reflection-type liquid crystal display element 6 has a structure in which the liquid crystal 9 is sandwiched between the pixel electrode 8 and the counter electrode 10. The pixel circuit 7 shown by a broken line is configured with a sample-and-hold unit 16 and a voltage selection circuit 17. The sample-and-hold unit 16 is configured with a flip-flop having an SRAM structure. The sample-and-hold unit 16 is connected to a column data line D and a row selection line W. The output of the sample-and-hold unit 16 is connected to the voltage selection circuit 17. The voltage selection circuit 17 is connected to a blanking voltage line V0 and a drive voltage line V1. The voltage selection circuit 17 is connected to the pixel electrode 8 and provides the pixel electrode 8 with a predetermined voltage. The voltage value of the counter electrode 10 is referred to as a common voltage Vcom.

Figure 4:
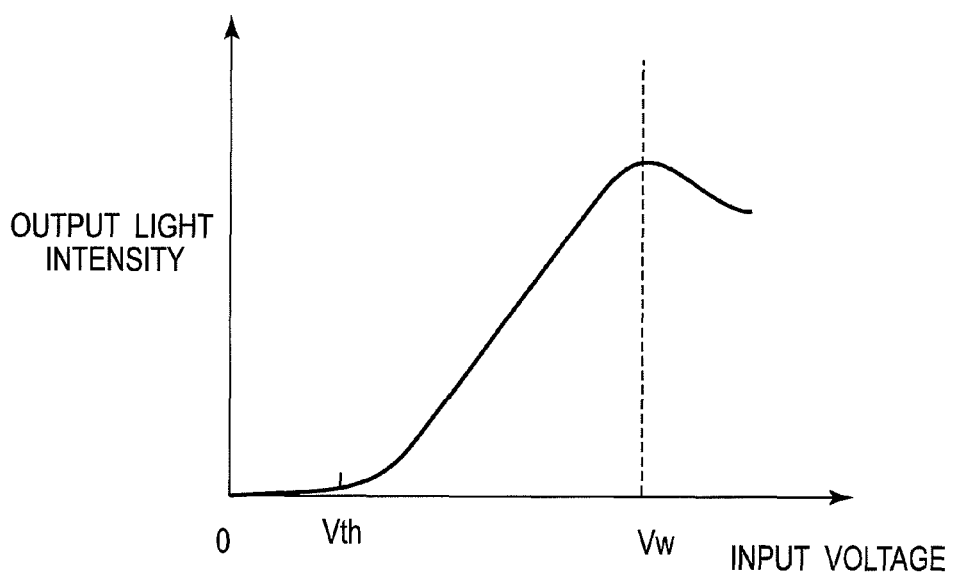
FIG. 4 is a diagram showing a relationship between an input voltage and an output light intensity in the reflection-type liquid crystal display element in the first embodiment of the present invention.

FIG. 4 is a diagram showing a relationship between an input voltage and an output light intensity in the reflection-type liquid crystal display element 6. In FIG. 4, the horizontal axis shows an input voltage and shows a potential difference between the pixel electrode 8 and the counter electrode 10, that is, a drive voltage of the liquid crystal 9. The vertical axis shows the intensity of the output light emitted from the liquid crystal 9. A voltage at which the intensity of the output light emitted from the liquid crystal 9 starts to increase is a threshold voltage Vth. When a voltage is zero (e.g., both of the pixel electrode 8 and the counter electrode 10 have GND voltages), the output light intensity is low and a black state is obtained (blanking voltage), and a voltage at which the output light starts to be saturated is a saturation voltage Vw (white level).

Figure 5:
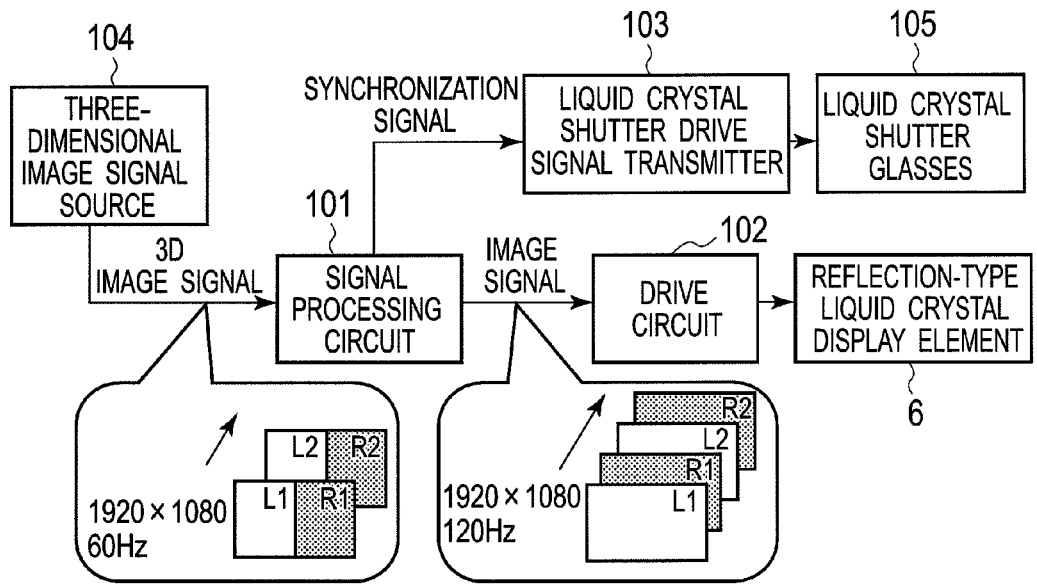
FIG. 5 is a diagram for illustrating signal processing of a 3D image signal in the first embodiment of the present invention.
Figure 6:
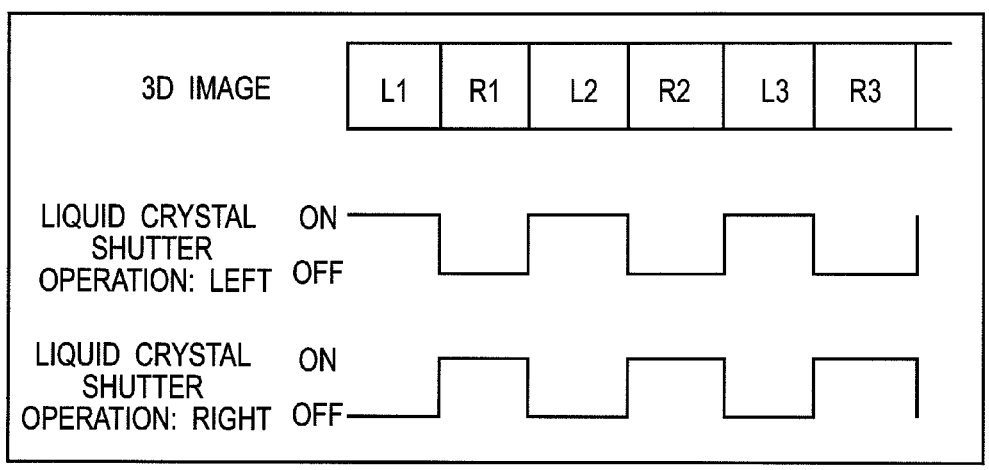
FIG. 6 is a diagram showing a temporal relationship between a decoded 3D signal and liquid crystal shutter glasses in the first embodiment of the present invention.

FIG. 5 is a diagram for illustrating signal processing of the 3D image signal. The 3D image signal sent out from the three-dimensional image signal source 104 is input into a signal processing circuit 101 of a signal processor. FIG. 5 shows a case in which the 3D image signal is provided in a side-by-side method of 60 Hz, as an example. In the signal processing circuit 101 of the signal processor, the input signal is separated into a left-eye signal and a right-eye signal and each of the signals is expanded right and left so as to become equal to a display screen size. The expanded left-eye signal and right-eye signal are rearranged temporally alternately and a display speed is converted into a double speed. The image signal decoded in this manner is input into a drive circuit 102. The drive circuit 102 drives the reflection-type liquid crystal display element 6 on the basis of the decoded image signal. A synchronization signal synchronized with the decoded image signal is sent from the signal processing circuit 101 to the liquid crystal shutter drive signal transmitter 103.

The liquid crystal shutter drive signal transmitter 103 determines liquid crystal shutter drive timing on the basis of the synchronization signal and outputs a liquid crystal shutter drive signal to the liquid crystal shutter glasses 105. A liquid crystal shutter of the liquid crystal shutter glasses 105 is driven on the basis of the liquid crystal shutter drive signal. While a state in which the 3D image signal is input in the side-by-side method of 60 Hz is shown in FIG. 5, the present embodiment is not limited to this method, and another frequency (e.g., 50 Hz, 24 Hz, or the like) and another three-dimensional image format (e.g., frame packing, top-and-bottom, line-by-line, or the like) may be used. Furthermore, while the signal processing circuit 101 converts the 3D image signal into a signal having a double frequency, the frequency conversion is not limited to double conversion and a higher frequency conversion may be used. A screen resolution may be also another resolution other than the number of pixels of 1,920×1,080.

Figure 7:
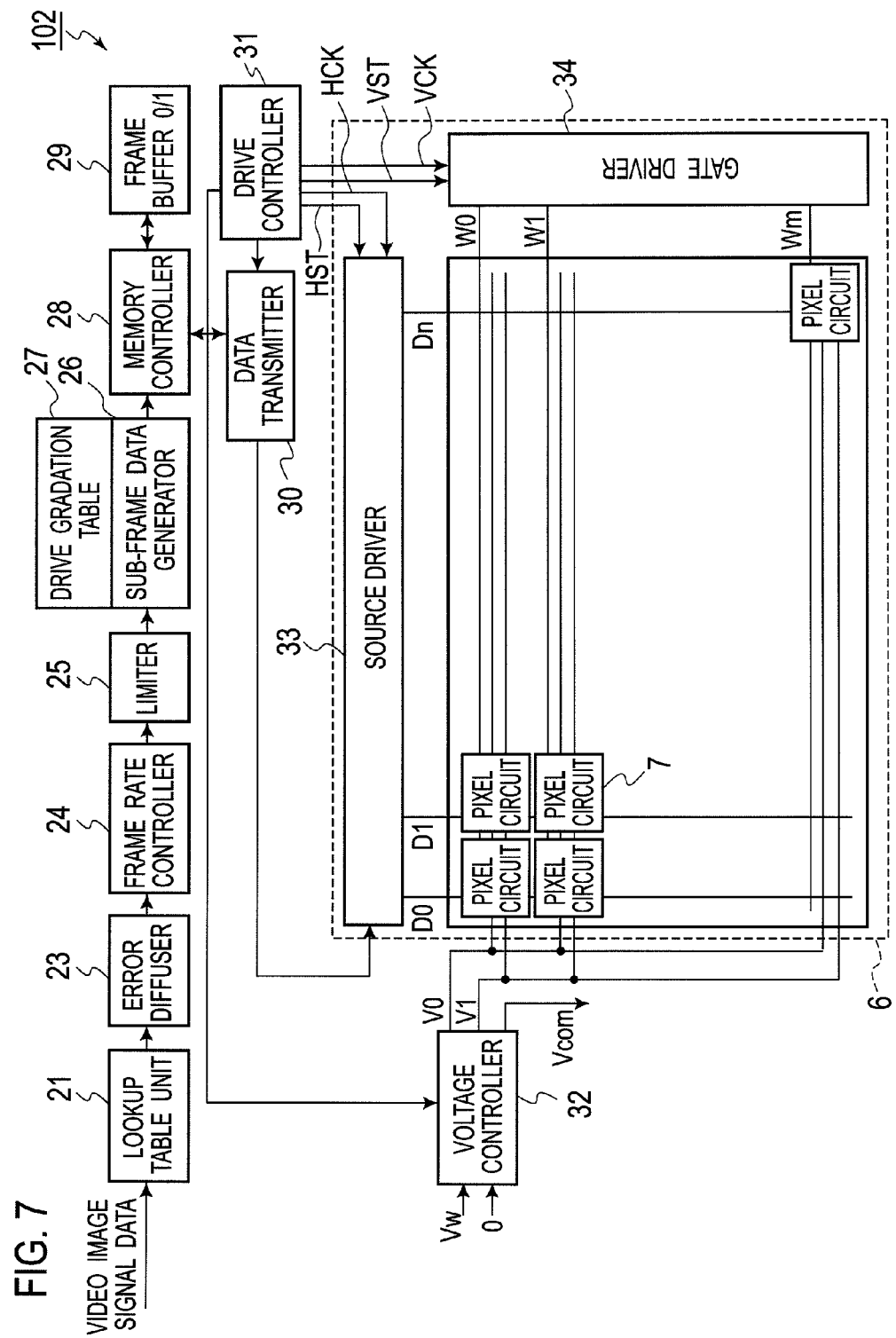
FIG. 7 is a block diagram showing a drive circuit driver according to the first embodiment of the present invention.
Figure 8:
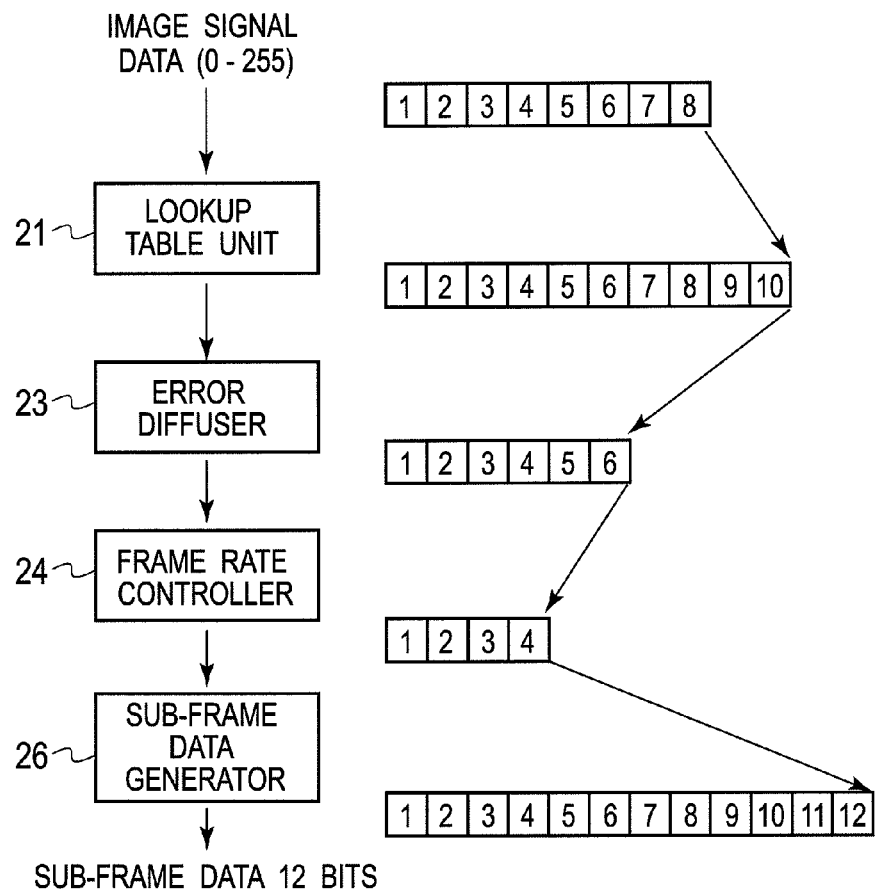
FIG. 8 is a diagram for illustrating gradation expression according to the first embodiment of the present invention.
Figure 9:
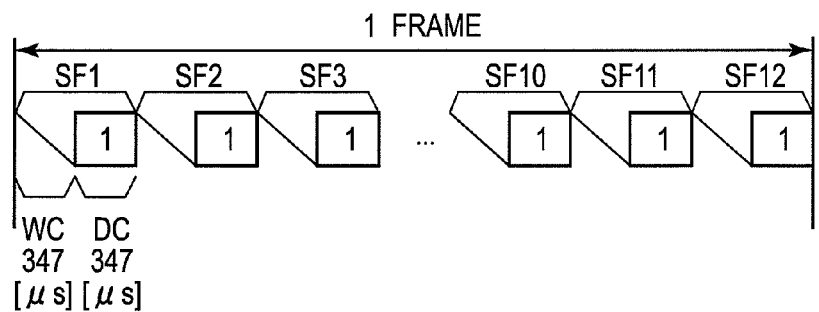
FIG. 9 is a diagram showing a drive pattern according to the first embodiment of the present invention.
Figures 10, 11:
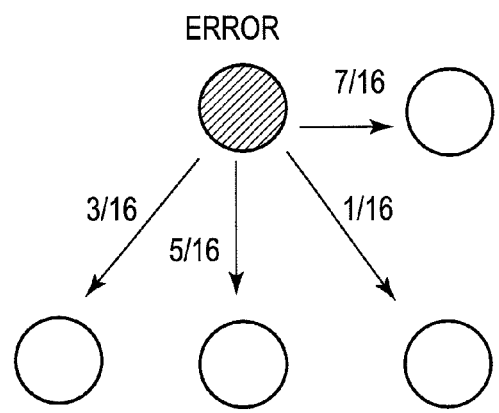
FIG. 10 is a diagram showing a drive gradation table according to the first embodiment of the present invention.
FIG. 11 is a diagram showing an error diffusion chart according to the first embodiment of the present invention.
Figure 12:
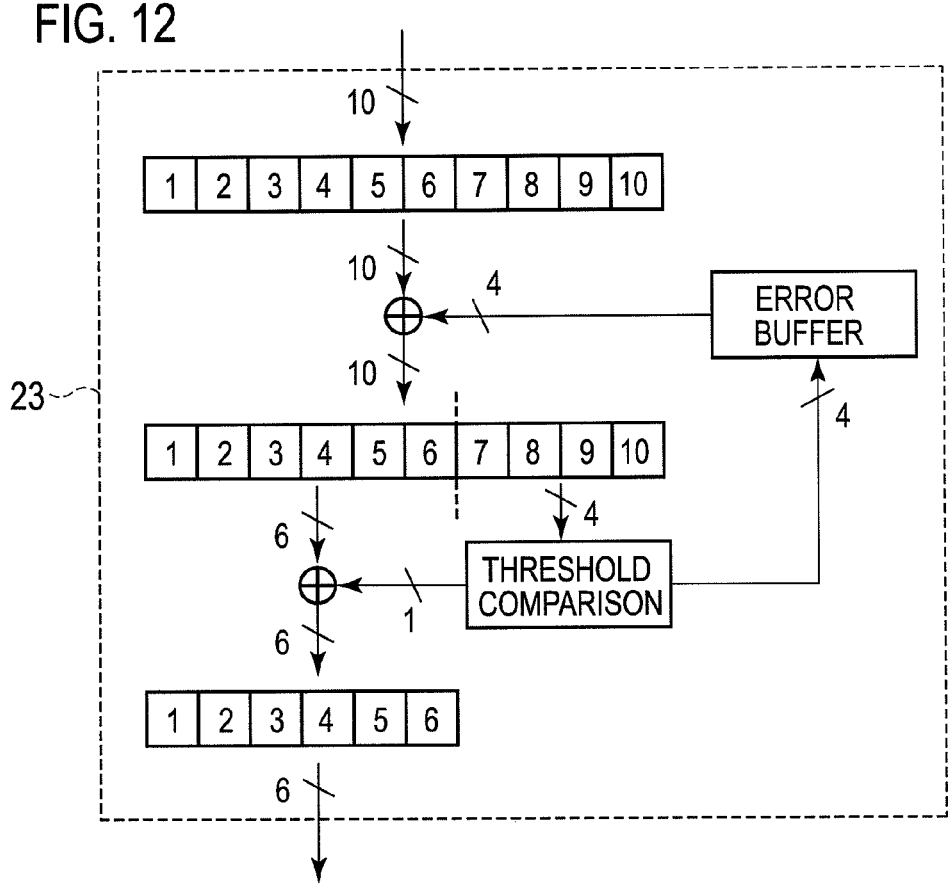
FIG. 12 is a diagram showing an error diffusion flow according to the first embodiment of the present invention.
Figure 13:
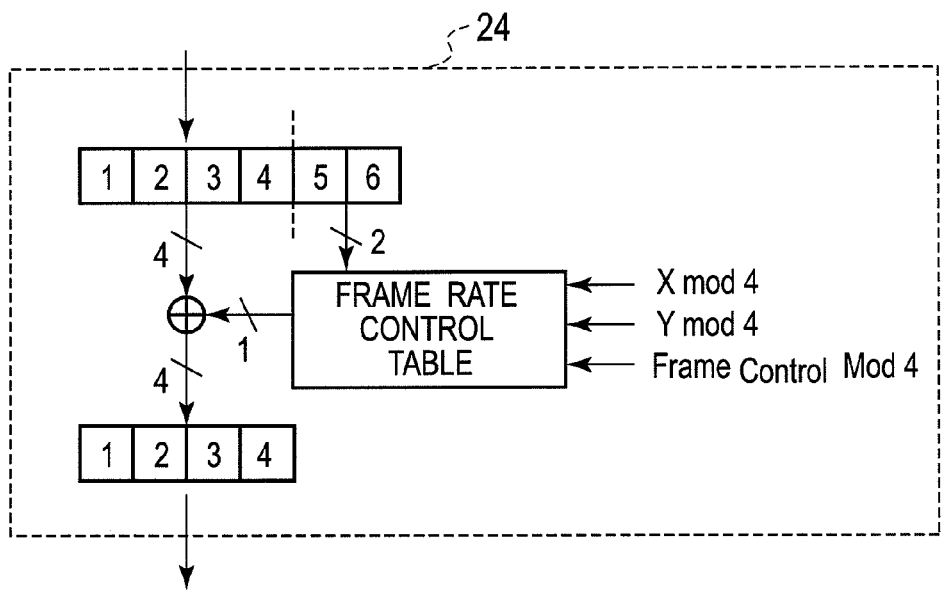
FIG. 13 is a diagram showing a frame rate control flow according to the first embodiment of the present invention.
Figure 14:
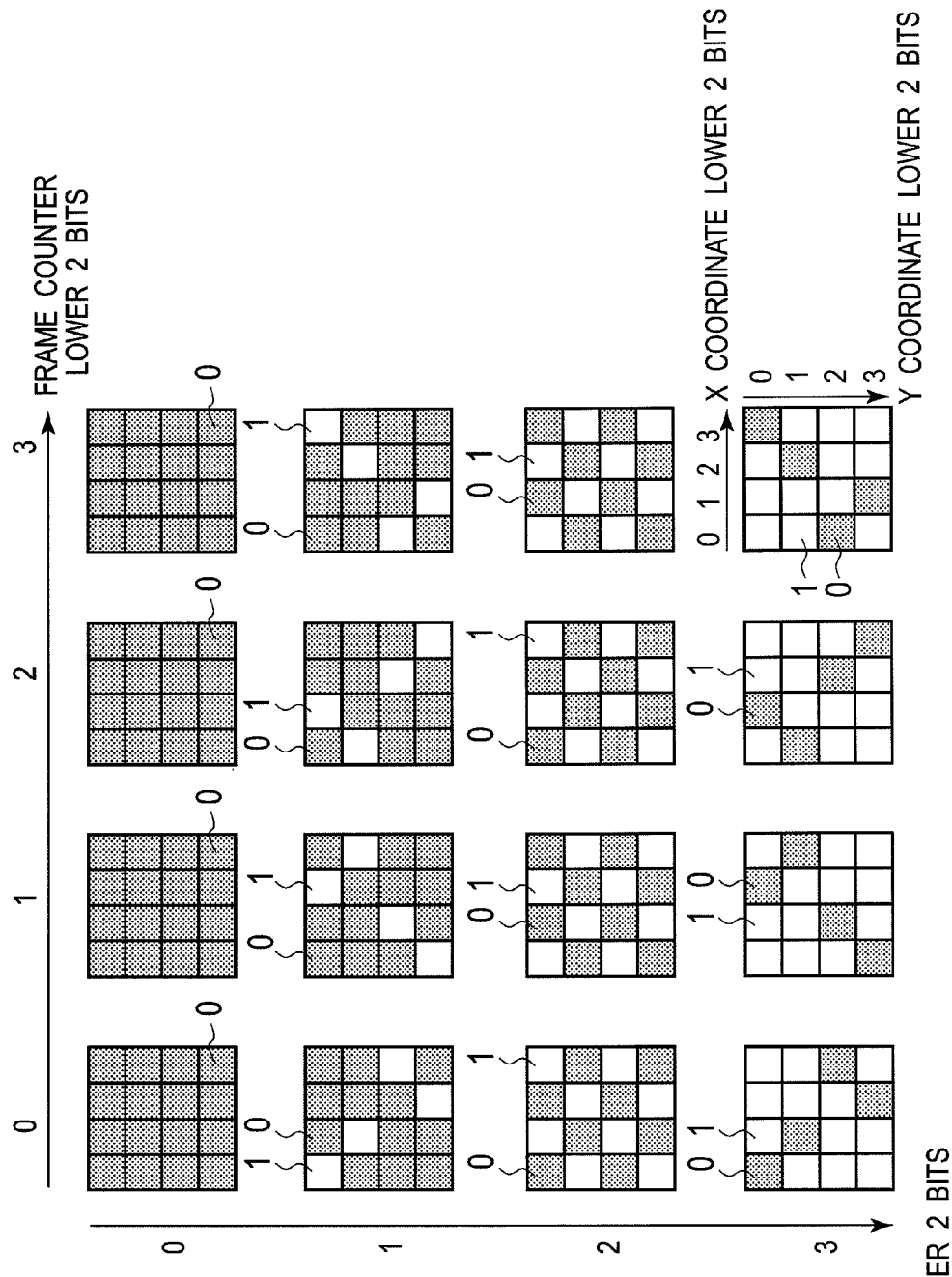
FIG. 14 is a diagram showing a frame rate control table according to the first embodiment of the present invention.

FIG. 7 is a block diagram showing the drive circuit (driver) 102. FIG. 8 is a diagram for illustrating gradation expression. FIG. 8 shows an example of the gradation expression in each processing unit when the number of bits in the input image signal data is 8. FIG. 9 is a diagram showing a drive pattern. FIG. 10 shows a drive gradation table. FIG. 11 is a diagram showing an error diffusion chart. FIG. 12 is a diagram showing an error diffusion flow. FIG. 13 is a diagram showing a frame rate control flow. FIG. 14 is a diagram showing a frame rate control table.

In FIG. 7, the input image signal of N bits is converted into data of (M+F+D) bits which is larger than N bits, in a lookup table unit 21. Here, M expresses the number of bits when the number of sub-frames is expressed by a binary number, D expresses the number of bits interpolated by an error diffuser 23, and F expresses the number of bits interpolated by a frame rate controller 24. Here, N, M, F, and D are integers.

In the example of FIG. 8, the number of bits in the input image data is assumed to be 8 (N=8), the number of bits interpolated in the error diffuser 23 is assumed to be 4 (D=4), and the number of bits interpolated in the frame rate controller 24 is assumed to be 2 (F=2). The number of bits expressed by a binary number for the number of sub-frames is assumed to be 4 (M=4), and the number of drive gradations is assumed to be 12 (without including black).

Here, operation of the lookup table unit 21 will be described. Generally, an image signal is subjected to gamma correction. On an image display apparatus side, it is necessary to perform inverse gamma correction on the image signal which has been subjected to the gamma correction, and to return the corrected gradation to a linear gradation. The inverse gamma correction is correction such that an output becomes the 2.2th power of X with respect to an input X. In this case, hereinafter, the output characteristic is expressed by "gamma 2.2". The lookup table unit 21 performs a function to realize a liquid crystal display apparatus which converts input-output characteristics of the reflection-type liquid crystal display element 6, to thereby have the gamma 2.2 output characteristic. The lookup table is preliminarily adjusted so as to cause a 10 bit output to have an optional output characteristic (e.g., gamma 2.2). For example, in the present embodiment, the liquid crystal display apparatus shown in FIG. 1 projects an image made by each driving for 12 drive gradations shown in FIG. 8 (without including black), and each illuminance value on the screen 13 is measured in advance by an illuminometer or the like. By linear interpolation in 6 bits (M+D=6) (64 gradations) for an illumination value between the respective drive gradations, illumination data for each of the gradations 0 to 768 is predicted. 256 pieces of data having the optional output characteristic (e.g., gamma 2.2) are selected from the illumination data and retained preliminarily as the lookup table.

The lookup table unit 21 has a lookup table of 256×10 bits (i.e., "the eighth power of two" gradations×(4+2+4) bits). Here, "the eighth power of two" gradations×(4+2+4) bits correspond to "the Nth power of two" gradations×(M+F+D) bits substituted with values of N=8, M=4, F=2, and D=4. The lookup table unit 21 converts the input 8 bit image data into 10-bit data for output.

Returning to FIG. 7, the image signal data converted into (M+F+D) bit data in the lookup table unit 21 is converted into (M+F) bit data by the error diffuser 23 which diffuses information of the lower D bits to the surrounding pixels. In the example of FIG. 8, the error diffuser 23 diffuses information of the lower 4 bits of the converted 10-bit data to the surrounding pixels and quantizes the resulting 10-bit data into data of the upper 6 bits for output.

The error diffusion method is a method compensating gradation shortage by diffusing, into the surrounding pixels, an error (display error) between an image signal to be displayed and an actually displayed value. In the present embodiment, the lower 4 bits of the image signal to be displayed is assumed to be a display error, and, as shown in FIG. 11, 7/16 of the display error is added to the right neighboring pixel, 3/16 of the display error is added to the left lower pixel, 5/16 of the display error is added to the directly lower pixel, and 1/16 of the display error is added to the right lower pixel.

Operation of the error diffuser 23 will be described in more detail in FIG. 12. The error of an image signal at a certain coordinate is diffused as described above and, at the same time, an error diffused for the previous image signal is added thereto. To the input 10-bit data, first, the error diffused for the previous video image is added from an error buffer. After the value of the error buffer has been added to the input image signal data, the resulting data is divided into the upper 6 bits and the lower 4 bits.

Values of the divided lower 4 bits are shown below. Values on the right-hand side are the display error.

| Lower 4 bits | Display error |
|---|---|
| 0000 | 0 |
| 0001 | +1 |
| 0010 | +2 |
| 0011 | +3 |
| 0100 | +4 |
| 0101 | +5 |
| 0110 | +6 |
| 0111 | +7 |
| 1000 | −7 |
| 1001 | −6 |
| 1010 | −5 |
| 1011 | −4 |
| 1100 | −3 |
| 1101 | −2 |
| 1110 | −1 |
| 1111 | 0 |

The display error corresponding to the value of the divided lower 4 bits is added to the error buffer and retained, as shown in FIG. 12. Furthermore, threshold comparison is performed on the value of the divided lower 4 bits, and, when the value is equal to or larger than 1000 (in a row in which the value of the above left column is 1000 and in rows thereafter), 1 is added to the value of the upper 6 bits. Then, data of the upper 6 bits is output from the error diffuser 23.

Returning to FIG. 7, the image signal data converted into (M+F) bit data in the error diffuser 23 is input into the frame rate controller 24. The frame rate controller 24 is provided with a frame rate control table. The frame rate controller 24 specifies a position within the frame rate control table from a value of the lower F bits, positional information of a pixel, and count information of a frame, and adds the value (value of 1 or 0, which is, hereinafter, described as 0/1) to the upper M bit, to thereby convert the image signal into M bit data. Here, the frame rate control method is a method of displaying a pseudo gradation for one pixel of a display element by having m (m: m≥2, natural umber) frames as one cycle and performing ON-display on n frames (n: n>0, m>n, natural number) and OFF-display on the remaining (m−n) frames.

In the example of FIG. 8, the 6-bit data output from the error diffuser 23 is input into the frame rate controller 24. The frame rate controller 24 derives the value of 0/1 from the frame rate control table according to the lower 2-bit information, the positional information in a display area, and the frame counter information, and adds the value of 0/1 to a value of the upper 4 bits separated from the input 6 bits.

Operation of the frame rate controller 24 will be described specifically in FIG. 13. The input 6-bit data is divided into the upper 4 bits and the lower 2 bits. The value of "0" or "1" shown in the frame rate control table of FIG. 14 is specified through the use of the value of 8 bits totaling the lower 2 bits of the input 6 bit data, the positional information of a pixel in the display area (i.e., lower 2 bits of an X coordinate and lower 2 bits of a Y coordinate which are coordinate data), and the lower 2 bits of the frame counter. The specified value of "0" or "1" is added to the upper 4-bit data and the result is output as 4-bit data.

Returning to FIG. 8, the 4-bit data output from the frame rate controller 24 is limited to 12, which is the maximum value of the drive gradation, in a limiter 25 shown in FIG. 7, and the resulting data is converted into 12-bit data in a sub-frame data generator 26 to be transmitted to the reflection-type liquid crystal display element 6. The conversion to the 12-bit data is performed through the use of a drive gradation table 27.

Returning to FIG. 7, the 12-bit data output from the sub-frame data generator 26 is stored into a frame buffer 29 which is divided for each sub-frame by a memory controller 28. The frame buffer 29 has a double buffer structure. While data is being stored in frame buffer 0, data of frame buffer 1 is transmitted to the reflection-type liquid crystal display element 6 via a data transmitter 30, and, for the next frame, the data of frame buffer 0 stored in the previous frame period is transmitted to the liquid crystal display element 6 via the data transmitter 30, and output data from the sub-frame data generator 26 for the input image signal data is stored into frame buffer 1.

A drive controller 31 controls processing timing and the like for each sub-frame, and performs transmission instruction to the data transmitter 30 and control of a gate driver 34. The data transmitter 30 performs instruction to a memory controller 28 according to instruction from the drive controller 31, and receives designated sub-frame data from the memory controller 28 and transmits the data to a source driver 33. Every time the source driver 33 receives data of one line from the data transmitter 30, the source driver 33 transmits the data to corresponding pixel circuits 7 of the reflection-type liquid crystal display element 6 using column data lines D0 to Dn at the same time. At this time, a gate driver 34 activates a row selection line Wy of a row designated by a vertical start signal (VST) and vertical shift clock signal (VCK) from the drive controller 31, and the data is transmitted to the pixels of all the columns in the designated row y.

A drive pattern in the present embodiment will be described by the use of FIG. 9. FIG. 9 shows a case in which the image signal has 120 frames per one second and the number of sub-frames is 12. WC expresses a data transmission period (WC period) for transmitting data of each sub-frame to all the pixels in the liquid crystal display element. DC expresses a drive period (DC period) for driving the liquid crystal. The WC period is assumed to be 347 [μs] and the DC period is assumed to be 347 [μs]. In one frame, the WC period and the DC period continue alternately 12 times. Data of 0 or 1 assigned to respective sub-frames are transmitted during the WC period in the temporal order of SF1, SF2, . . . , SF11, and SF12 from the top, and the liquid crystal in all the pixels is driven in the DC period. When the data sampled-and-held in a pixel is 0, the pixel reaches a blanking state and, for the case of 1, the pixel reaches a drive state.

Next, the drive gradation table of the present embodiment shown in FIG. 10 will be described. The same as in FIG. 9, the image signal is assumed to have 120 frames per one second, the number of sub-frames is assumed to be 12, the data transmission period (WC period) is assumed to be 347 [μs], and the drive period (DC period) is assumed to be 347 [μs]. FIG. 10 shows states during the DC period for respective sub-frames with respect to each drive gradation. The gradation in the vertical column of FIG. 10 is the 4-bit data obtained in the frame rate controller 24 and is limited to 12 which is the maximum value of the drive gradation by the limiter 25. SF1 to SF12 express a sub-frame order within one frame. The case of 1 in the DC period column shows the drive state. The case of 0 in the DC period column shows the blank state.

When the gradation shown in the vertical column of FIG. 10 is 1, only SF12 which is the last sub-frame reaches the drive state. When the gradation is 2, only SF11 and SF12 reach the drive state. Successively, every time the gradation number is increased, the number of sub-frames reaching the drive state is increased, and, for the case of 12 which is the highest gradation, all the sub-frames reach the drive state. In other words, as the gradation number is increased, the number of sub-frames having the drive state is increased in the temporally previous direction.

The present embodiment obtains an effect that generation of crosstalk is suppressed as will be described in the following. FIG. 15 is a diagram showing a screen for illustrating the generation of the crosstalk. FIG. 15 provides 2D display of a screen where a circular region having a high gradation (H) exists in a low gradation (L).

FIG. 16 is a diagram showing an image projected onto a screen from the liquid crystal display apparatus 100 when the image of FIG. 15 is displayed as a 3D (three-dimensional) image by a three-dimensional image display apparatus. A right-eye image and a left-eye image are displayed temporally alternately on the screen as shown in FIG. 16. FIG. 17 is a diagram showing temporal changes of the gradations in the screen for region 1, region 2, region 3, and region 3' shown in FIG. 16. As shown in FIG. 17, while gradation H and gradation L are displayed continuously in region 1 and region 2, respectively, gradation H and gradation L are displayed temporally and alternately in region 3 and region 3'.

Figure 18:
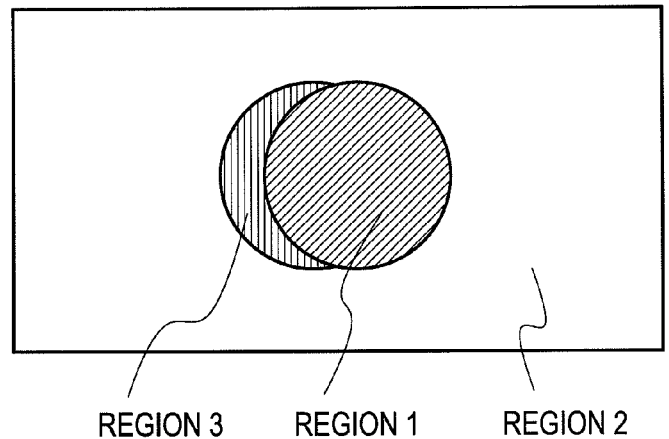
FIG. 18 is a diagram showing a view with a pair of liquid crystal shutter glasses when three-dimensional (3D) display of the image in FIG. 15 is performed by the three-dimensional image display apparatus according to the first embodiment of the present invention.

FIG. 18 is a diagram showing a view with a pair of liquid crystal shutter grasses 105 when the image of FIG. 15 is displayed as a three-dimensional (3D) image by the three-dimensional image display apparatus. For the observer, it appears that region 1 has gradation H and region 2 has gradation L, as shown in FIG. 18. It has to appear that region 3 has gradation L. However, there is a case where a gradation higher than gradation L is displayed because of gradation H of the previous field (right-eye field). In such a case, the gradation of region 3 becomes close to the gradation of the right-eye signal (gradation H), and thus the observer recognizes this situation as a crosstalk phenomenon.

When the drive for the reflection-type liquid crystal display element 6 is analog drive, a drive voltage according to a signal level is applied and the gradation is reproduced. The response speed of the liquid crystal tends to become slower in the case of a drive voltage corresponding to an intermediate gradation than in the case of a high drive voltage for the liquid crystal. Therefore, the effect on the following frame is great. Accordingly, although gradation L has to be reproduced, a gradation higher than gradation L is displayed because of gradation H of the previous frame (right-eye frame) and the crosstalk phenomenon is generated. In digital drive, while the crosstalk phenomenon is generated in a method of using the gradation drive table shown in FIG. 20 to be described below, in the analog drive case, the crosstalk is generated in a noticeable extent.

Figure 19:
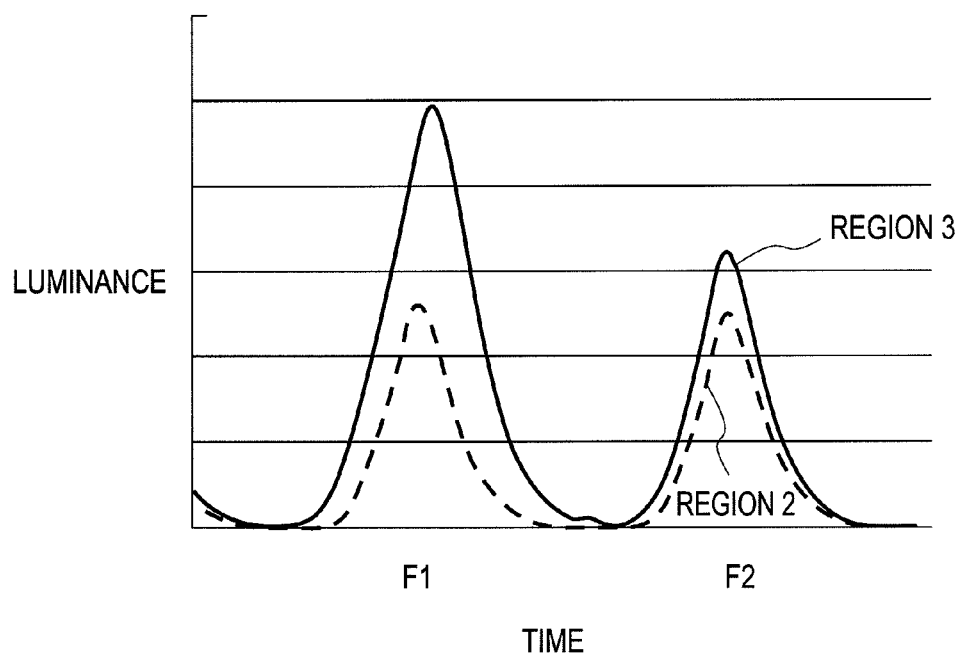
FIG. 19 is a diagram in which response characteristics of the liquid crystal display element are compared between regions 2 and 3 shown in FIG. 16.

FIG. 19 is a diagram in which response characteristics of the liquid crystal are compared between in region 2 and region 3. In the reflection-type liquid crystal display element 6, gradation L is input into both of region 2 and region 3 in frame F2 (left-eye frame). In frame F1 (right-eye frame), gradation H and gradation L are input into region 3 and region 2, respectively. Although the liquid crystal display element should display the same gradation L in both regions 2 and 3 in frame F2, displayed luminance becomes different because of being influenced by a gradation level of the previous frame (frame F1).

In the digital drive using the drive gradation table of FIG. 10 in the present embodiment, it is possible to suppress a crosstalk phenomenon as described above. An effect of suppressing the crosstalk phenomenon will be described in the following by using the drive gradation table shown in FIG. 20 as a comparison example.

Figures 20, 21:
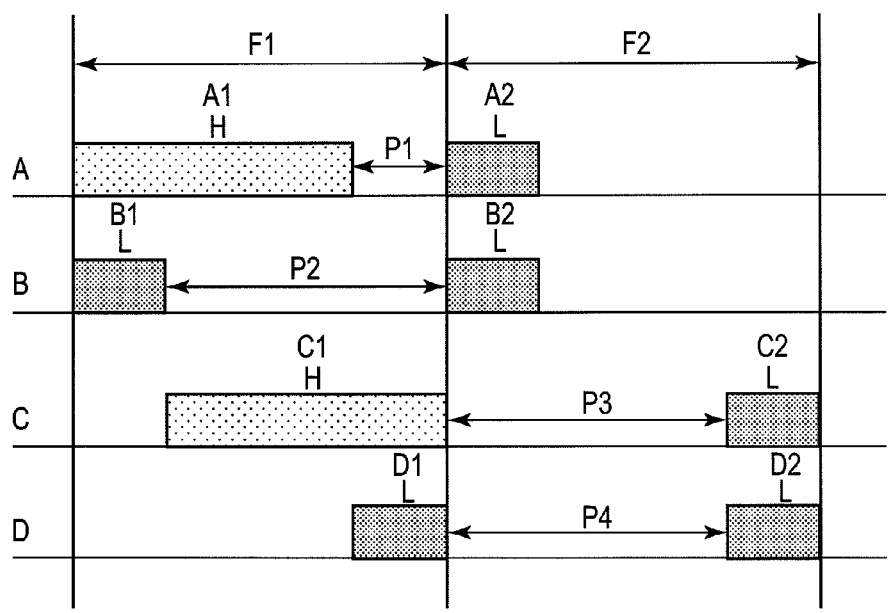
FIG. 20 is a diagram showing a comparison example of a drive gradation table according to the first embodiment of the present invention.
FIG. 21 is a diagram in which respective states of driving are schematically compared between a case of the drive gradation table in FIG. 20 for a comparison example (A and B) and a case of the drive gradation table in FIG. 10 according to the first embodiment (C and D), where F2 frame represents gradation L and F1 frame represents gradation H and gradation L.

FIG. 20, in the same way as FIG. 10, is a diagram showing states of the DC period for respective sub-frames with respect to each drive gradation. The same as in FIG. 10, there will be described a case of an image signal having 120 frames per one second and 12 sub-frames. The data transmission period (WC period) is set to 347 [μs] and the drive period (DC period) is set to 347 [μs]. That is, the gradation in the vertical columns of FIG. 20 is the 4-bit data obtained in the frame rate controller 24 and is limited to 12 which is the maximum value of the drive gradation, in the limiter 25. SF1 to SF12 express a sub-frame order within one frame. The case of 1 in the DC period column shows a drive state. The case of 0 in the DC period column shows a blank state.

FIG. 21 is a diagram in which respective states of driving are schematically compared between a case of the drive gradation table in FIG. 20 for a comparison example (A and B) and a case of the drive gradation table in FIG. 10 according to the first embodiment (C and D), where F2 frame represents gradation L and F1 frame represents gradation H and gradation L. First, the case of the drive gradation table that is the comparison example (A and B) will be described. In A, a blanking state period (P1) is short after the drive state having a high gradation and a long period (H). In B, a blanking state period (P2) is long after the drive state having a low gradation and a short period (L). When the periods of the blanking state are different, display levels in frame F2 become different between A and B. Specifically, because of a different influence level of the previous frame, luminance displayed in the period of the drive state having a low gradation (L) for the next frame is increased from luminance to be displayed. In contrast, in each of C and D of the first embodiment, the length of the blanking state period in F2 frame is the same even when the drive state is a high gradation or a low gradation, and thus the same luminance is displayed.

Figure 22:
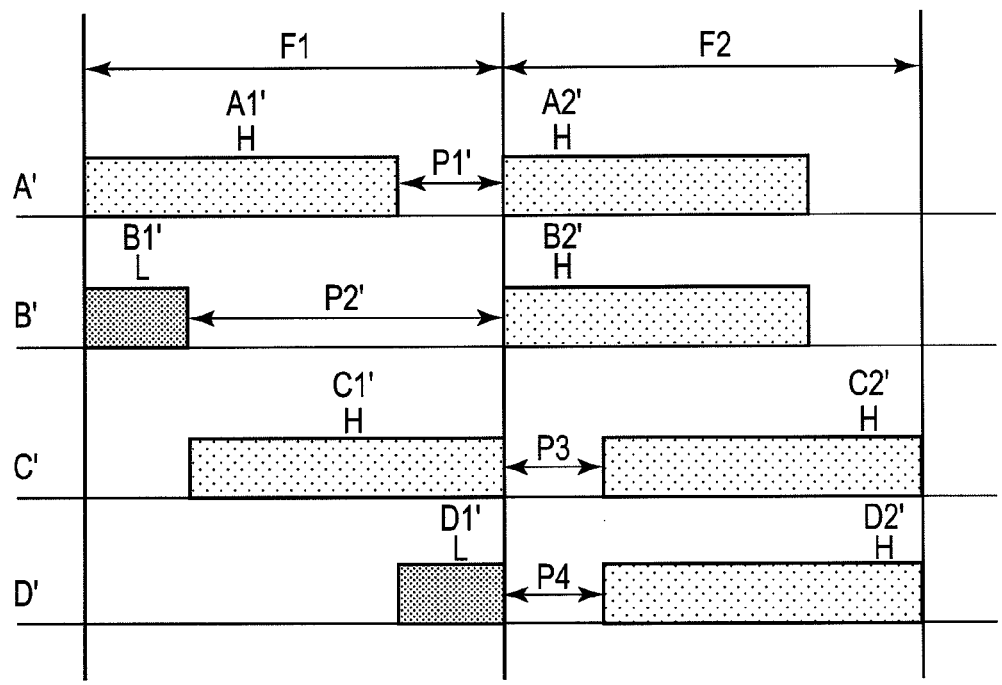
FIG. 22 is a diagram showing comparison when a focused gradation is set to H in FIG. 21.

While attention is paid to gradation L in FIG. 21, the same result is obtained when attention is paid to gradation H. FIG. 22 is a diagram showing a comparison when the gradation to which attention is paid is H in FIG. 21. A' and B' show cases of FIG. 20 in which the drive gradation table is the comparison example, and C' and D' show cases of FIG. 10 in which the drive gradation table is the first embodiment. Gradation in F2 is gradation H in the case of both A2' and B2', and thus same luminance has to be displayed, but different luminance is displayed because the length of the blanking state period of the previous frame is different (P1'≠P2'). This causes the crosstalk. Next, attention is paid to C2' and D2'. Gradation in F2 is gradation H in the case of both C2' and D2'. Although gradation is different in the previous frame, the length of the blanking state period is the same (P3'=P4'), and thus the same luminance can be displayed. That is, the crosstalk can be suppressed.

As described above, without depending on whether gradation of the previous frame is high or low, there can be obtained an effect of suppressing the crosstalk phenomenon by causing the blanking state period from the fall of the previous frame to the rise of the present frame to be the same.

Figure 23:
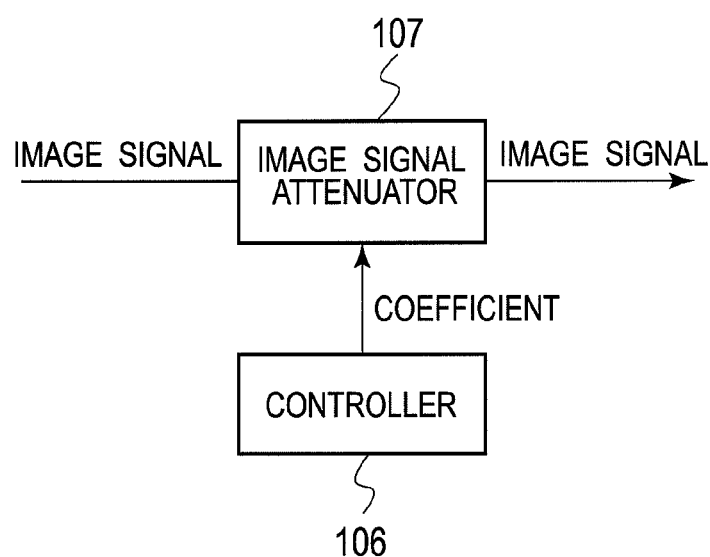
FIG. 23 is a diagram showing an image signal attenuator inserted between a signal processing circuit and a drive circuit according to the first embodiment of the present invention.

When the response speed of the liquid crystal shutter glasses 105 is slow and it takes time to open and close a shutter, or when the response time of the reflection-type liquid crystal display element 6 is slow and it takes time to switch an image to be displayed, an image signal level may be changed. FIG. 23 is a diagram showing an image signal attenuator 107 inserted between the signal processing circuit 101 and the drive circuit 102. The change of the image signal level is performed by the image signal attenuator 107 inserted between the signal processing circuit 101 and the drive circuit 102. The image signal attenuator 107 is controlled by a controller 106. An observer may set the setting of the image signal attenuator 107 by using a remote controller or the like, for example.

Here, a new image level is calculated by the following arithmetic expression in the image signal attenuator 107.

New image level=Coefficient X*Input signal image level, where 0<X<1.

Here, if X is assumed to be 0.88, for example, a new image level is calculated to be 204 when an input signal level is 255. Even when the maximum image level of 255 is input as an input signal, 204 is output as a new image level and the image level is treated as 204 in the drive circuit and the following circuits. That is, when X is smaller than 1, the image level does not fill the maximum display gradation in the drive circuit and the following circuits, without depending on the input signal level, and the blanking period is always inserted for each frame.

By the insertion of the blanking period, it is possible to prevent left-eye and right-eye images from being mixed when the liquid crystal shutter is switched between ON and OFF or the image is switched. When the response speed of the liquid crystal shutter is slow and it takes time to open and close the shutter, preferably the blanking period starts at the timing when the liquid crystal shutter starts to fall or rise, and ends at the timing when the liquid crystal shutter has fallen or risen completely.

Generally, the response speed of the liquid crystal changes depending on temperature, and the response speed tends to increase as temperature rises. Therefore, a value of the coefficient X in the signal attenuator may be a fixed value, or a temperature detection means is provided to feed back the temperature of the reflection-type liquid crystal display element or the liquid crystal shutter of the liquid crystal shutter glasses, and the value of the coefficient X may be changed in accordance with the temperature. Furthermore, when detection of the temperature thereof is difficult, the value of the coefficient X may be changed on the basis of another parameter such as ambient air temperature.

Figure 24:
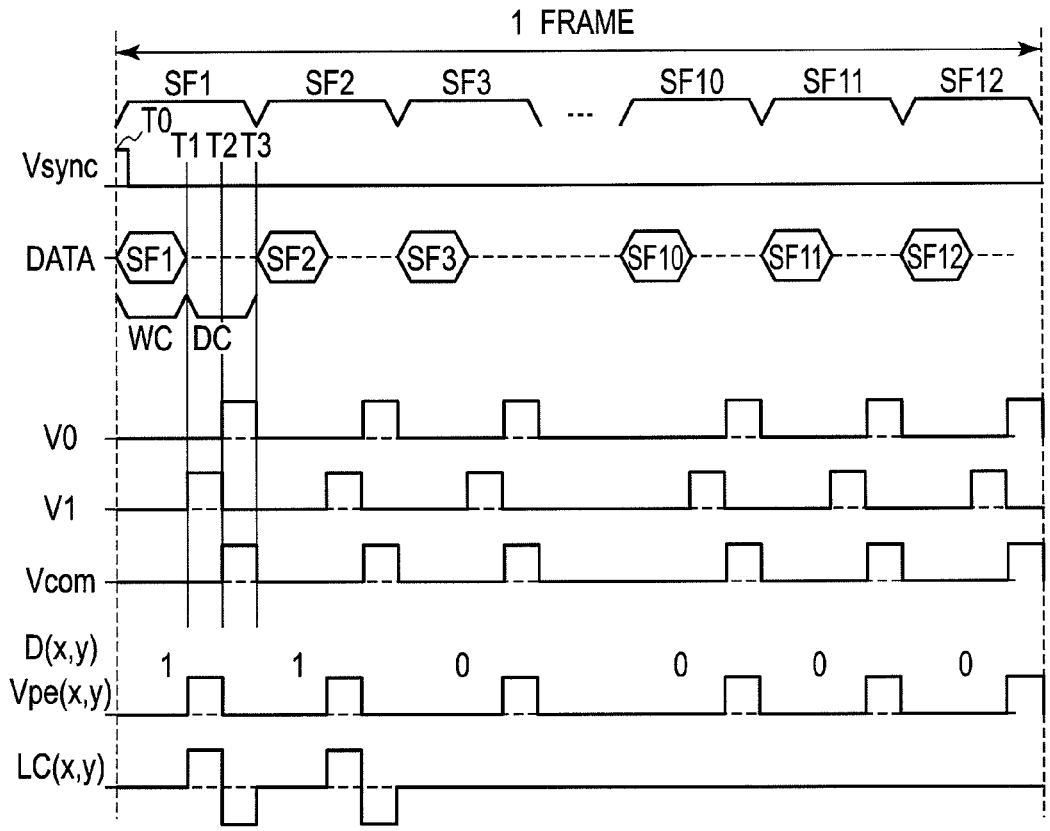
FIG. 24 is a diagram showing signal processing according to the first embodiment of the present invention.
Figure 25:
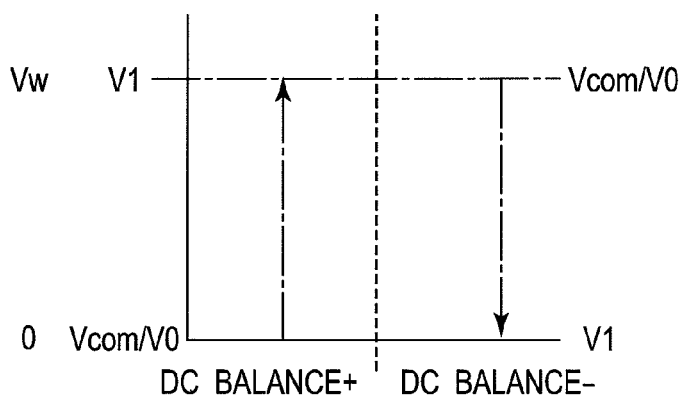
FIG. 25 is a diagram showing polarity inversion driving of the reflection-type liquid crystal display element according to the first embodiment of the present invention.

FIG. 24 is a diagram showing signal processing in the present embodiment. FIG. 25 is a diagram showing polarity inversion driving of the reflection-type liquid crystal display element 6 in the present embodiment. The signal processing will be described in FIG. 24 with reference to FIG. 3, FIG. 7, and FIG. 9.

In FIG. 24, a vertical synchronization signal Vsync becomes active at time T0, and, first, data of sub-frame 1 (SF1) is transmitted to the reflection-type liquid crystal display element 6 during a period of time T0 to time T1. This period (T0 to T1) serves as the transmission period WC. During the transmission period WC, the reflection-type liquid crystal display element 6 is required to have the blanking state without depending on a sampled-and-held value in a pixel, and V0, V1, and Vcom are set to be the same voltage (here, GND). Here, V0 is a blanking voltage, V1 is a drive voltage, and Vcom (common voltage) is a voltage of the counter electrode 10 for the liquid crystal. The transmission ends at time T1 and the next period (T1 to T3) becomes the drive period DC. Time T2 is exactly the middle point of the period (T1 to T3), and a period (T1 to T2) and a period (T2 to T3) have the same length. A voltage controller 32 performs control so as to cause V1 to be Vw and to cause V0 and Vcom to be GND in the period (T1 to T2), and, to cause V1 to be GND and cause V0 and Vcom to be Vw in the period (T2 to T3), opposite to the period (T1 to T2).

When the sampled-and-held value in the pixel circuit 7 is "0", a voltage selection circuit 17 in the pixel circuit 7 applies V0 to the pixel electrode 8. In the period T1 to T2, both of a pixel electrode voltage Vpe and the counter electrode voltage Vcom become GND. A voltage applied to the liquid crystal 9 becomes 0 [V] and the state of the liquid crystal becomes the blanking state.

When the sampled and held value in the pixel circuit 7 is "1", the voltage selection circuit 17 in the pixel circuit 7 applies V1 to the pixel electrode 8. In the period T1 to T2, the pixel electrode voltage Vpe becomes Vw, and the counter electrode voltage Vcom becomes GND. The voltage applied to the liquid crystal 9 becomes +Vw (reference to the counter electrode voltage), and the liquid crystal reaches the drive state. In the period T2 to T3, the pixel electrode voltage Vpe becomes GND, the counter electrode voltage Vcom becomes VW, and the voltage applied to the liquid crystal 9 becomes −Vw (reference to the counter electrode voltage) and the drive state is reached.

By means of applying voltages having the same amplitude and different polarities (+Vw and −Vw) to the liquid crystal during the same period and setting an average voltage applied to the liquid crystal for a long time as +Vw+(−Vw)=0 [V], image sticking is prevented. Also for SF2 to SF12, there is performed voltage control similar to the voltage control for SF1 in the period T0 to T3. In FIG. 25, a state corresponding to the state in the period (T1 to T2), that is, a state in which V1 becomes Vw and V0 and Vcom become GND is denoted by DC balance +. Furthermore, a state corresponding to the state in the period (T2 to T3), that is, a state in which V1 becomes GND and V0 and Vcom reach Vw is denoted by DC balance −.

Meanwhile, in the present embodiment, description is provided by taking, as an example, the projection-type display apparatus including the reflection-type liquid crystal display element 6 of the active matrix type as a display element. Here, there will be described a characteristic in the case of driving the liquid crystal using the drive gradation table of FIG. 10. In FIG. 10, the gradation is assumed to be K (K≥1). Then, SF (13−K) to SF 12 have values of 1 (drive state). The values of 1 for SF (13−K) to SF 12 are considered as an almost continuing ON state and resultantly, a relationship between K (gradation number) and output light exhibits a curve close to the relationship, shown in FIG. 4, between the input voltage and the output light intensity in the reflection-type liquid crystal display element 6. This affects the operation of the lookup table unit 21 advantageously. That is, the relationship between the input voltage and the output light intensity in the reflection-type liquid crystal display element 6 is comparatively close to the curve of gamma 2.2 which is a target of the lookup table unit 21, and thus a load of conversion into the curve of gamma 2.2 is reduced in the lookup table unit 21. The above advantage also applies to that of a transmission-type liquid crystal display element.

Moreover, as shown in FIG. 9 and FIG. 10, the present embodiment also has a feature in respect of using only step bit pulses having the same width without using binary bit pulses which cause a false contour of a moving image. The binary bit pulse is subjected to so-called "binary weighting" in which a weight for each sub-field is expressed by $2^n$ (n=0, 1, 2, 3, ... ). In contrast, the step bit pulses mean pulses having the same weight such as 32, 32, 32, 32, 32, 32, and 32 when the binary bit pulses of 1, 2, 4, 8, 16 exist. In comparison with the case of using only the binary bit pulses, combination with the step bit pulses provides an effect of relatively reducing the false contour of a moving image.

The false contour of a moving image means that, in the case of neighboring pixels having similar gradations, unintended luminance is perceived by eyes, when many of binary bit pulses in one pixel have drive state and many of binary bit pulses in the other pixel have blanking state, and when the line of sight is moved or a closed-up face or the like moves. The present embodiment uses only the step bit pulses having the same width without using the binary bit pulses causing the false contour of a moving image. Therefore, even when the line of sight is moved, luminance does not change significantly, and thus the false contour of a moving image is scarcely perceived.

Figure 26:
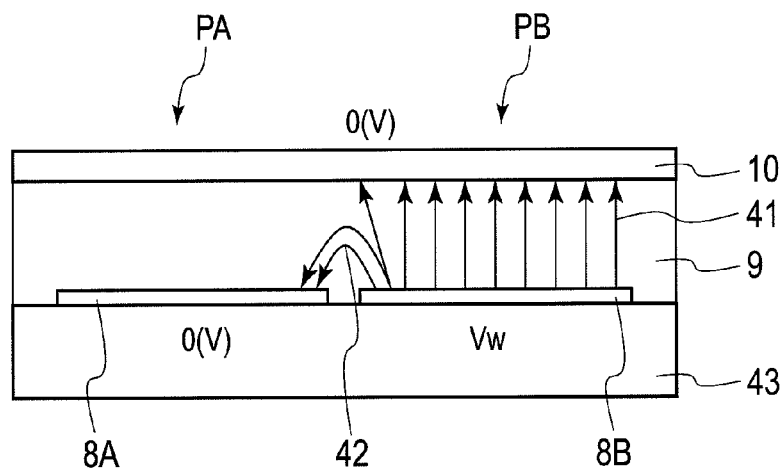
FIG. 26 is a diagram for illustrating a generation mechanism of a lateral electric field in the reflection-type liquid crystal display element according to the first embodiment of the present invention.

Next, there will be described an effect of providing the drive circuit in the liquid crystal display apparatus using the reflection-type liquid crystal display element, with the frame rate controller. FIG. 26 is a diagram for illustrating a generation mechanism of a lateral electric field in the reflection-type liquid crystal display element. As shown in FIG. 26, the pixel electrodes 8A and 8B of the reflection-type liquid crystal display element are formed on a silicon substrate 43.

In the case of the digital drive, frequently there arises a case in which the state of driving (drive or blanking) is different between the neighboring pixels. For example, the gradations of the neighboring pixels in some frame are assumed to be "5" (pixel PA) and "6" (pixel PB), respectively. Furthermore, a case is considered in which the counter electrode 10 has a voltage of V0 in DC balance +. That is, in FIG. 25, DC balance+ means V0=Vcom=0 (V) and V1=Vw. At the time of sub-frame 7, the drive states are different between the neighboring pixels. As can be seen from FIG. 10, since the pixel PA is in a blanking state, a voltage of V0 is applied to the pixel electrode 8A, and, since the pixel PB is in a drive state, a voltage of V1 is applied to the pixel electrode 8B.

FIG. 26 shows a state of electric fields 41 in a liquid crystal layer when the voltage of V0 is applied to the pixel electrode 8A and the voltage of V1 is applied to the pixel electrode 8B. A potential difference is caused between the pixel electrode 8B of the pixel PB (potential: Vw) and the counter electrode 10 (potential: 0 (V)) and the liquid crystal is caused to rotate by a predetermined amount. At this time, a potential difference is caused also between the pixel electrode 8A of the pixel PA (potential: 0 (V)) and the pixel electrode 8B of the pixel PB (potential: Vw), and electric fields are caused in the lateral direction. Such lateral electric fields 42 cause unintended confusion in the motion of the liquid crystal between pixels. This phenomenon is a cause of image degradation.

Figure 27:
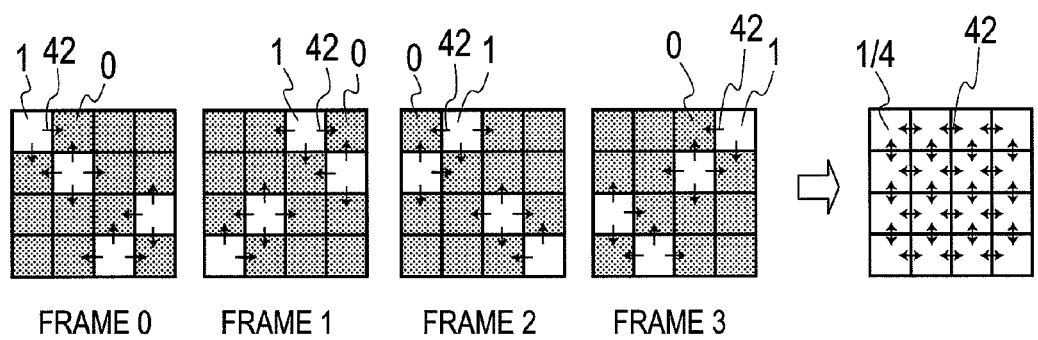
FIG. 27 is a diagram for illustrating that lateral electric fields are dispersed uniformly by frame rate control according to the first embodiment of the present invention.

By using the frame rate control, it is possible to resolve the above problem. FIG. 27 is a diagram for illustrating that the lateral electric fields are uniformly dispersed by the frame rate control.

FIG. 27 illustrates a case in which the value of the lower F bits of the input data ((M+F) bits) input into the frame rate controller is "01". Four tables (frames 0 to 3) are used for each frame. When the states (drive or blanking) are different between the neighboring pixels in each of the frames, the lateral electric field is caused in the direction from the pixel having a state of "1" (drive state) to the pixel having a state of "0" (blanking state). The direction of the lateral electric field between the pixels is expressed by an arrow in FIG. 27. The state shown in the right-hand end is a state in which the lateral electric fields of the four frames are overlapped with one another. That is, through averaging the four frames, the lateral electric fields between all the pixels are cancelled by each other. As described above, through the use of the frame rate control, it has become possible to cancel the lateral electric field which is a cause of image degradation.

Second Embodiment

Figure 28:
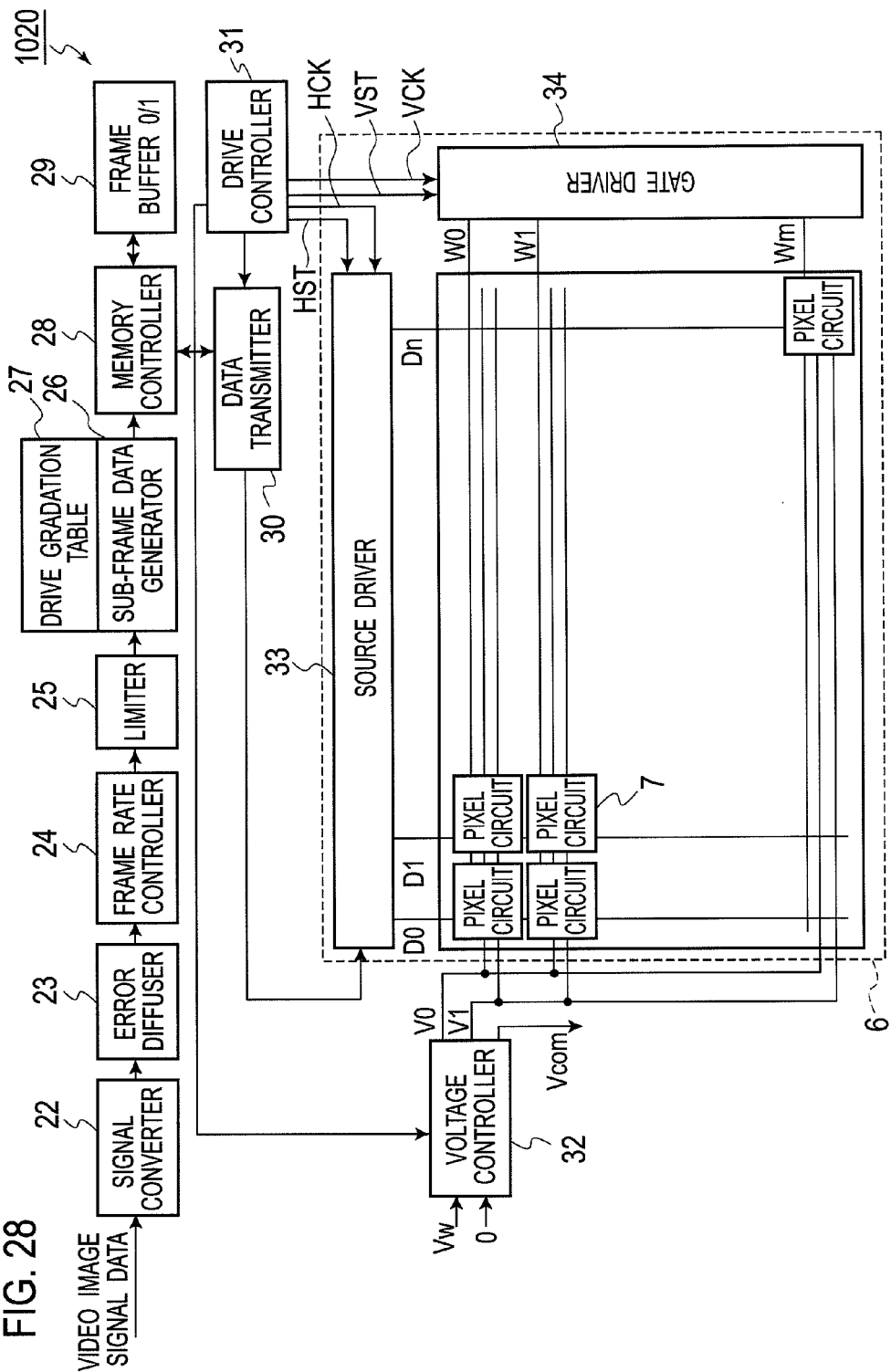
FIG. 28 is a block diagram showing a drive circuit (driver) according to a second embodiment of the present invention.

FIG. 28 is a block diagram showing a drive circuit 1020 according to the present embodiment of the present invention. In the drive circuit according to the present embodiment, a different point from the drive circuit 102 of the first embodiment shown in FIG. 7 is that the lookup table unit 21 is changed to a signal converter 22. The configuration of the error diffuser 23 and the following units is the same as that of the dive circuit of the first embodiment.

Figures 29, 30:
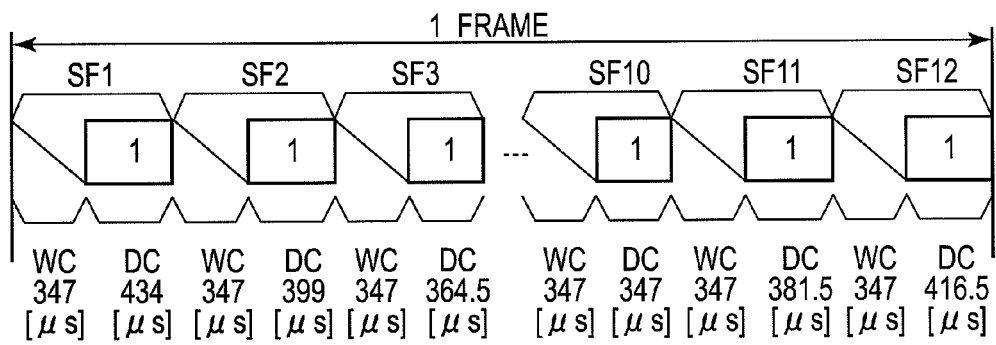
FIG. 29 is a diagram showing an example of a drive pattern in the second embodiment of the present invention.
FIG. 30 is a diagram for illustrating that periods of sub-frames are changed according to the second embodiment of the present invention.

FIG. 29 is a diagram showing an example of a drive pattern in the present embodiment. In the drive pattern of the present embodiment, in the same way as in the drive pattern of the first embodiment, the image signal has 120 frames per one second, the number of sub-frames is 12, and the data transmission period (WC period) is 347 [μs]. In contrast, while the drive periods of all the sub-frames have the same length in the case of the first embodiment, the drive period (DC period) for each sub-frame in FIG. 29 is different timewise.

FIG. 30 is a diagram for illustrating that the drive period (DC period) for each sub-frame in the present embodiment is changed from that in the first embodiment. In FIG. 29 and FIG. 30, setting of the drive gradation follows that in the first embodiment. That is, when the gradation shown in the vertical column of FIG. 10 in the first embodiment is "1", only SF 12 which is the last sub-frame reaches the drive state. When the gradation is "2", only SF 12 and SF 11 reach the drive state. Successively, every time the gradation number is increased, the number of sub-frames coming to have the drive state is increased, and, in the case of the highest gradation of 12, all the sub-frames reach the drive state. In other words, as the gradation number is increased, the number of sub-frames reaching the drive state is increased in the temporally previous direction.

Figure 31:
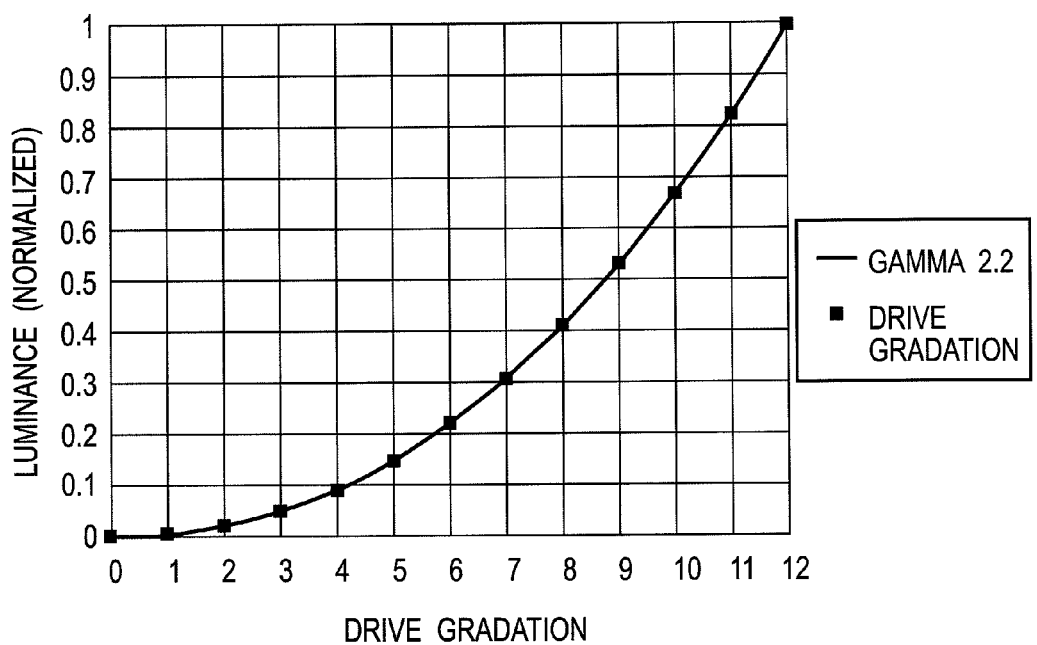
FIG. 31 is a diagram expressing that luminance for each drive gradation exists on a line of gamma 2.2 by adjusting each sub-frame period according to the second embodiment of the present invention.

In FIG. 30, there will be described the point in which the period for each sub-frame is changed from that of the first embodiment. The lookup table unit 21 of FIG. 7 performs a function to realize a liquid crystal display apparatus which has input-output characteristics of gamma 2.2 by converting the input-output characteristics of the reflection-type liquid crystal display element 6. In the second embodiment, the function converting the input-output characteristic is performed by "changing the length of the drive period (DC period) for each sub-frame". This will be described specifically in the following. FIG. 31 is a diagram for illustrating that each sub-frame period is adjusted and a luminance value for each drive gradation exists on a gamma 2.2 line in the present embodiment. In the present embodiment, the DC period for each sub-frame is preliminarily set as shown in FIG. 30 so as to cause luminance characteristics for each drive gradation to become a gamma 2.2 line as shown in FIG. 31, for example.

As a result of the above setting, it is possible to eliminate the function of the inverse gamma correction from the lookup table unit. Resultantly, the lookup table unit 21 using the lookup table can be changed to the signal converter 22 without using the lookup table. The change of the lookup table unit 21 to the signal converter 22 causes a cost reduction effect.

In the following, the signal converter 22 will described. In the present embodiment, since interpolated drive gradation itself has luminance characteristics of gamma 2.2, an arithmetic expression shown below can be applied using a relational expression:

Input gradation $X$:Interpolated drive gradation $Y$=255 (maximum input gradation):768 (maximum interpolated drive gradation).

The signal converter 22 performs calculation of image signal data input by using the following arithmetic expression.

Output data $Y$:($M$+$F$+$D$) bits=Input data $X$*768/255, where 768:maximum interpolated drive gradation (i.e., 1100000000, and 255:maximum drive gradation.

Here, the drive gradation expresses the gradation at a single pixel which is expressed in FIG. 9, FIG. 10, and FIG. 20. In addition, the interpolated drive gradation expresses a gradation including pseudo gradations interpolated in the error diffuser and the frame rate controller.

Furthermore, the present embodiment also has the same effect as the first embodiment.

In the first and second embodiments, when the number of bits in the input image signal data is assumed to be N, the number of bits when expressing, as binary numbers, the number of gradations capable of driving the display element is assumed to be M, the number of bits diffused by the error diffusion processing as an error is assumed to be D, and the number of bits expressed as pseudo gradations by the frame rate control is assumed to be F, a case of N=8, M=4, D=4, and F=2 is described. However, the values of N, M, D, and F are not limited to these values, and the present invention can be carried out through use of various values. Among the various values, it is more preferable to set N=8 to 12, M=4 to 6, D=4 to 8, and F=2 to 3.

What is claimed is:

1. A three-dimensional image display apparatus comprising:
    a signal processor configured to convert an input 3D image signal into a signal in which a left-eye signal and a right-eye signal are rearranged temporally alternately;
    a driver including a sub-frame data generator configured to, according to the signal in which the left-eye signal and the right-eye signal are rearranged temporally alternately, configure all sub-frames with step bit pulses, and generate sub-frame data by using a drive gradation table in which (1) the last sub-frame reaches a drive state when a drive gradation is "1" and (2) the number of sub-frames reaching the drive state is increased one by one toward ahead of a sub-frame which has already reached the drive state, every time the drive gradation is increased by one;
    an image signal attenuator provided between the signal processor and the driver and configured to attenuate the signal in which the left-eye signal and the right-eye signal are rearranged temporally alternately, by multiplying a coefficient which is larger than 0 and smaller than 1 by the signal, to make the initial sub-frame a blanking state constantly;
    a liquid crystal display element configured to be driven by the driver;
    an illumination optical system configured to cause illumination light to enter into the liquid crystal display element; and
    a projection lens configured to project modulated light emitted from the liquid crystal display element.

2. The three-dimensional image display apparatus according to claim 1, wherein
    the driver further includes:
    a lookup table unit configured to convert signal data of N bits in which the left-eye signal and the right-eye signal are rearranged temporally alternately into data of (M+F+D) bits when N, M, F, and D are integers, by performing inverse gamma correction and linear interpolation, where (M+F+D) is larger than N;
    an error diffuser configured to convert the (M+F+D) bit data processed in the lookup table unit into (M+F) bit data by error diffusion processing; and
    a frame rate controller configured to convert the (M+F) bit data processed in the error diffuser into M bit data by frame rate control, wherein
    the sub-frame data generator uses the M bit data processed in the frame rate controller, and configures all the sub-frames with the step bit pulses and generates the sub-frame data by using the drive gradation table in which (1) the last sub-frame reaches the drive state when the drive gradation is "1" and (2) the number of sub-frames reaching the drive state is increased one by one toward ahead of the sub-frame which has already reached the drive state, every time the drive gradation is increased by one.

3. A three-dimensional image display apparatus, comprising:
    a signal processor configured to convert an input 3D image signal into a signal in which a left-eye signal and a right-eye signal are rearranged temporally alternately;
    a driver including a sub-frame data generator configured to, according to the signal in which the left-eye signal and the right-eye signal are rearranged temporally alternately, configure sub-frames in which at least a part of the sub-frames has a different drive period, and generate sub-frame data by using a drive gradation table in which (1) the last sub-frame reaches a drive state when a drive gradation is "1" and (2) the number of sub-frames reaching the drive state is increased one by one toward ahead of a sub-frame which has already reached the drive state, every time the drive gradation is increased by one;
    an image signal attenuator provided between the signal processor and the driver and configured to attenuate the signal in which the left-eye signal and the right-eye signal are rearranged temporally alternately, by multiplying a coefficient which is larger than 0 and smaller than 1 by the signal, to make the initial sub-frame a blanking state constantly;
    a liquid crystal display element configured to be driven by the driver;
    an illumination optical system configured to cause illumination light to enter into the liquid crystal display element; and
    a projection lens configured to project modulated light emitted from the liquid crystal display element.

4. The three-dimensional image display apparatus according to claim 3, wherein
    the driver further includes:
    a signal convertor configured to convert signal data of N bits in which the left-eye signal and the right-eye signal are rearranged temporally alternately into data of (M+F+D) bits, when N, M, F, and D are integers, by performing linear interpolation, where (M+F+D) is larger than N;
    an error diffuser configured to convert the (M+F+D) bit data processed in the signal convertor into (M+F) bit data by error diffusion processing; and a frame rate controller configured to convert the (M+F) bit data processed in the error diffuser into M bit data by frame rate control, wherein the sub-frame data generator uses the M bit data processed in the frame rate controller, and generates the sub-frame data according to the drive gradation table in which (1) the last sub-frame reaches the drive state when the drive gradation is "1" and (2) the number of sub-frames reaching the drive state is increased one by one toward ahead of the sub-frame which has already reached the drive state, every time the drive gradation is increased by one, and in which the drive period of each sub-frame is changed so as to causes light output of a liquid crystal to have an inverse gamma characteristic to input image signal data.

* * * * *